(12) United States Patent
Thompson

(10) Patent No.: US 6,499,248 B2
(45) Date of Patent: Dec. 31, 2002

(54) PROTECTIVE FISHING ROD HOLDER FOR VEHICLES

(76) Inventor: John A. Thompson, 6301 Donaldson Rd., Grants Pass, OR (US) 97528

( * ) Notice: Subject to any disclaimer, the term of this patent is extended or adjusted under 35 U.S.C. 154(b) by 73 days.

(21) Appl. No.: 09/898,961

(22) Filed: Jul. 3, 2001

(65) Prior Publication Data
US 2002/0002791 A1 Jan. 10, 2002

Related U.S. Application Data
(60) Provisional application No. 60/215,823, filed on Jul. 5, 2000.

(51) Int. Cl.$^7$ .............................................. A01K 97/10
(52) U.S. Cl. ...................................................... 43/21.2
(58) Field of Search ................................. 43/21.2, 18.1

(56) References Cited

U.S. PATENT DOCUMENTS

| | | | | | |
|---|---|---|---|---|---|
| 2,995,855 | A | * | 8/1961 | Bell | 43/21.2 |
| 4,198,775 | A | * | 4/1980 | Leisner | 43/21.2 |
| 4,807,384 | A | * | 2/1989 | Roberts, Sr. | 43/21.2 |
| 4,827,654 | A | * | 5/1989 | Roberts | 43/21.2 |
| 5,121,565 | A | * | 6/1992 | Willie et al. | 43/21.2 |
| 5,231,785 | A | * | 8/1993 | Roberts | 43/21.2 |

* cited by examiner

Primary Examiner—Thomas Price
(74) Attorney, Agent, or Firm—Olson & Olson

(57) ABSTRACT

The fishing rod holder of this invention includes an elongated tube provided with an elongated slot through which a fishing rod is receivable for containment within the tube. A notch at one or both ends of the slot is configured to seat the reel component of one or two fishing rods and restrict longitudinal movement of the rod in the tube. A retainer is secured to the tube for removably spanning the slot for securing a fishing rod removably in the tube. In one embodiment the retainer is in the form of an outer tube received over the inner, rod-containing tube and provided with an axially extending slot. The outer tube is rotatable on the inner tube to afford registration of the slots in both tubes, to enable removal of the fishing rod from the inner tube. The outer tube may be of any length. Lock mechanism may releasably interengage the tubes when the outer tube closes the inner slot. Support blocks are mounted on the inner tube axially outward of the ends of the outer tube and displaced circumferentially from the slot in the inner tube. The support blocks serve to secure the inner tube to a supporting surface such as an automobile top, automobile cargo space, the hull of a boat, or to any other suitable surface, and they are oriented to allow access to the inner tube slot for removal of a fishing rod therefrom.

10 Claims, 4 Drawing Sheets

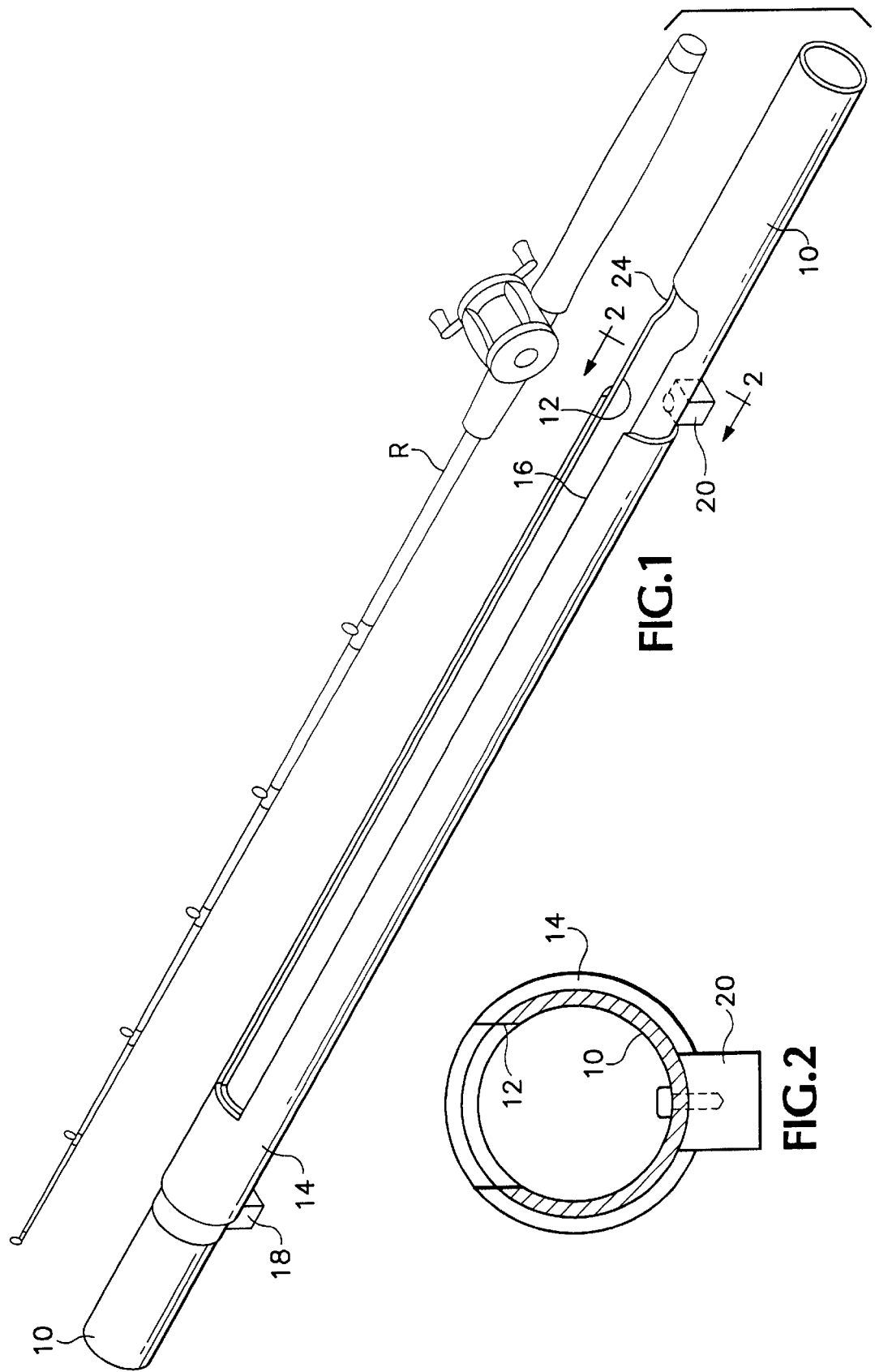

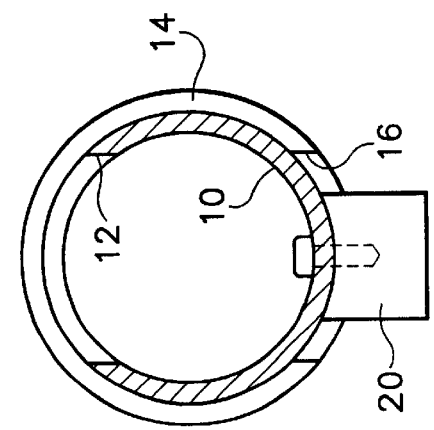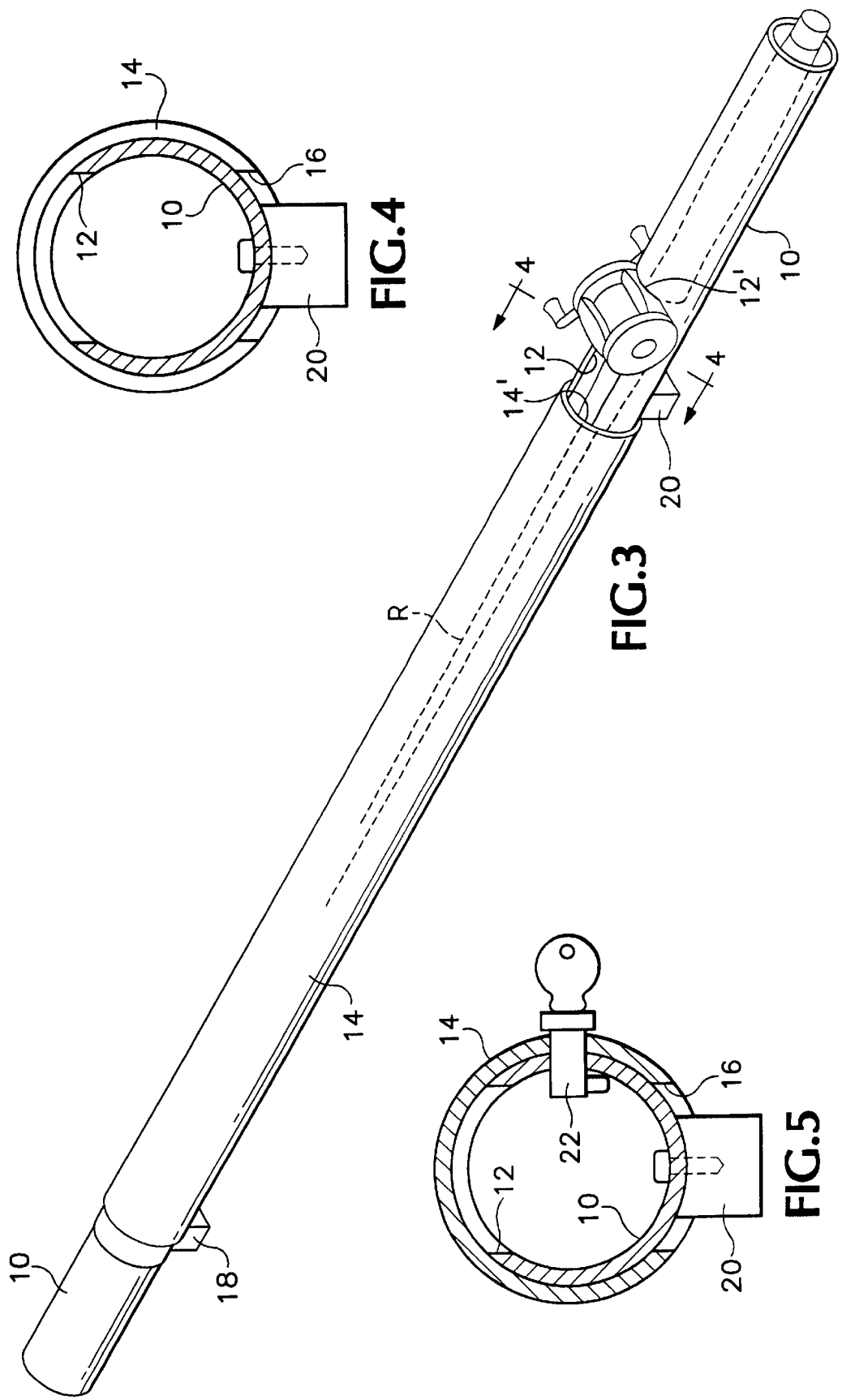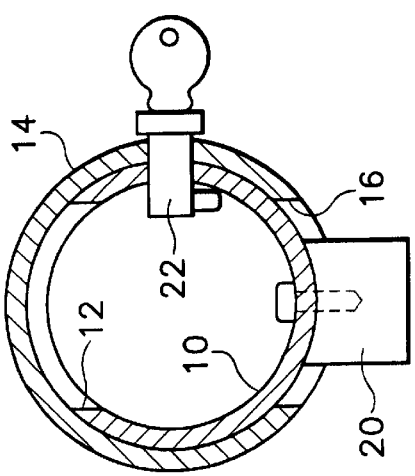

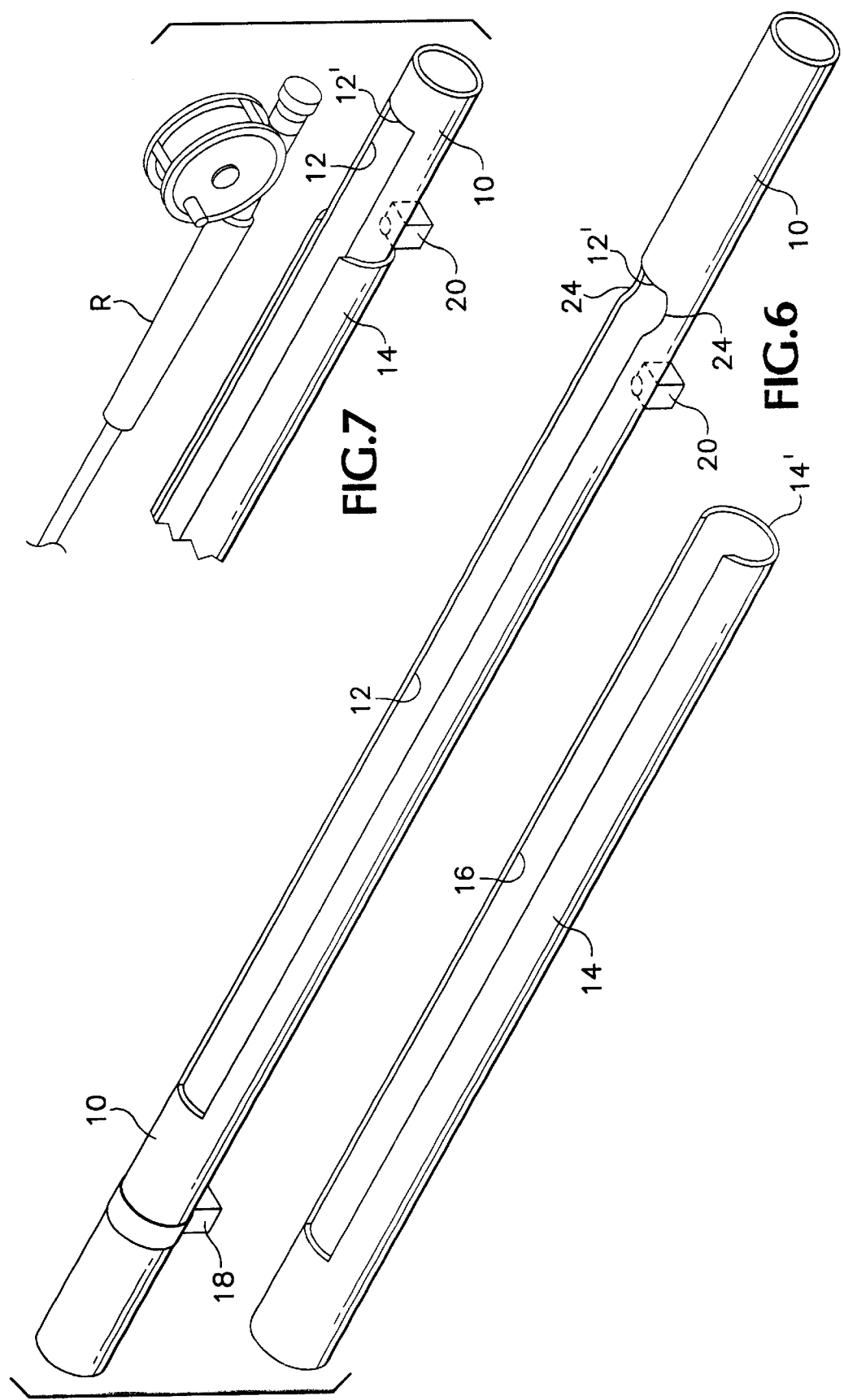

PROTECTIVE FISHING ROD HOLDER FOR VEHICLES

This application claims the benefit under 35 USC 119(e) of provisional application Ser. No. 60/215,823, filed Jul. 5, 2000.

BACKGROUND OF THE INVENTION

The present invention relates to fishing rod holders, and more particular to a protective holder for reel-mounted fishing rods arranged primarily for mounting on vehicles for transport of fishing rods between uses.

As is well known to those familiar with the sport, fishing rods typically are rather long and flexible and susceptible to damage during transport and storage between uses, particularly in circumstances where they must be carried on vehicles such as automobiles, boats, rafts and others where only limited space is available for both equipment and people. Also, as those involved in fishing well know, fishing rods and reels are oftentimes quite expensive which only further increases the importance of providing for their safe, secure and protected storage particularly on vehicles on which they are being transported between uses.

As can be appreciated by everyone, a long, fragile, and expensive fishing rod is generally a difficult item to carry in a conventional car, particularly when the car is filled with other equipment and supplies as well as those persons going fishing. It can also be appreciated that simply tying a long, slender, flexible rod to the outside of a car would leave it extremely susceptible to damage by the airstream created as the car travels, as well as leaving the expensive rod and reel vulnerable to easy theft. Other hazards arise in connection with boats, and particularly in small, open boats, canoes, inflatable rafts and the like where unsecured, unprotected fishing rods may easily be lost or damaged due to tipping, capsizing, water rushing over the boat, etc.

SUMMARY OF THE INVENTION

The fishing rod holder of this invention includes an elongated tube provided with an elongated slot through which a fishing rod is receivable for protective containment within the tube. A notch at one or both ends of the slot is configured to seat the reel component of one or two fishing rods and restrict longitudinal movement of the rod in the tube. A retainer is secured to the tube for removably spanning the slot for securing a fishing rod removably in the tube.

It is the principal objective of this invention to provide a protective, secure holder for reel-mounted fishing rods for secure storage and transport.

Another objective of this invention is the provision of a protective fishing rod holder that is capable of secure but releasable mounting on various types of supports, affording transfer between such mounts, as from a vehicle to a stationary home or other building.

Still another objective of this invention is the provision of a protective fishing rod holder in which a fishing rod and reel assembly is lockable to prevent theft of unattended equipment.

A further objective of this invention is the provision of a fishing rod holder of simplified construction for economical manufacture.

The foregoing and other objects and advantages of this invention will appear from the following detailed description, taken in connection with the accompanying drawings of preferred embodiments.

BRIEF DESCRIPTION OF THE DRAWINGS

FIG. 1 is a perspective exploded view of a fishing rod holder embodying the features of this invention, the holder being shown in open, empty condition ready to receive a bait casting rod and reel.

FIG. 2 is a sectional view of the fishing rod holder of FIG. 1, taken along the line 2—2 in FIG. 1.

FIG. 3 is a perspective view of the holder and fishing rod of FIG. 1 combined for protective storage and the outer tube rotated to closed condition securing the fishing rod against removal from the holder.

FIG. 4 is a sectional view taken on the line 4—4 in FIG. 3.

FIG. 5 is a sectional view similar to FIG. 4 showing a removable cylinder lock interengaging the inner and outer tubes when in closed, storage condition.

FIG. 6 is perspective exploded view of the fishing rod holder of FIG. 1, showing the inner and outer tubes in disassembled condition.

FIG. 7 is a fragmentary perspective exploded view of a fishing rod holder and fly rod and reel preliminary to assembly.

DESCRIPTION OF THE PREFERRED EMBODIMENTS

Figure 8:
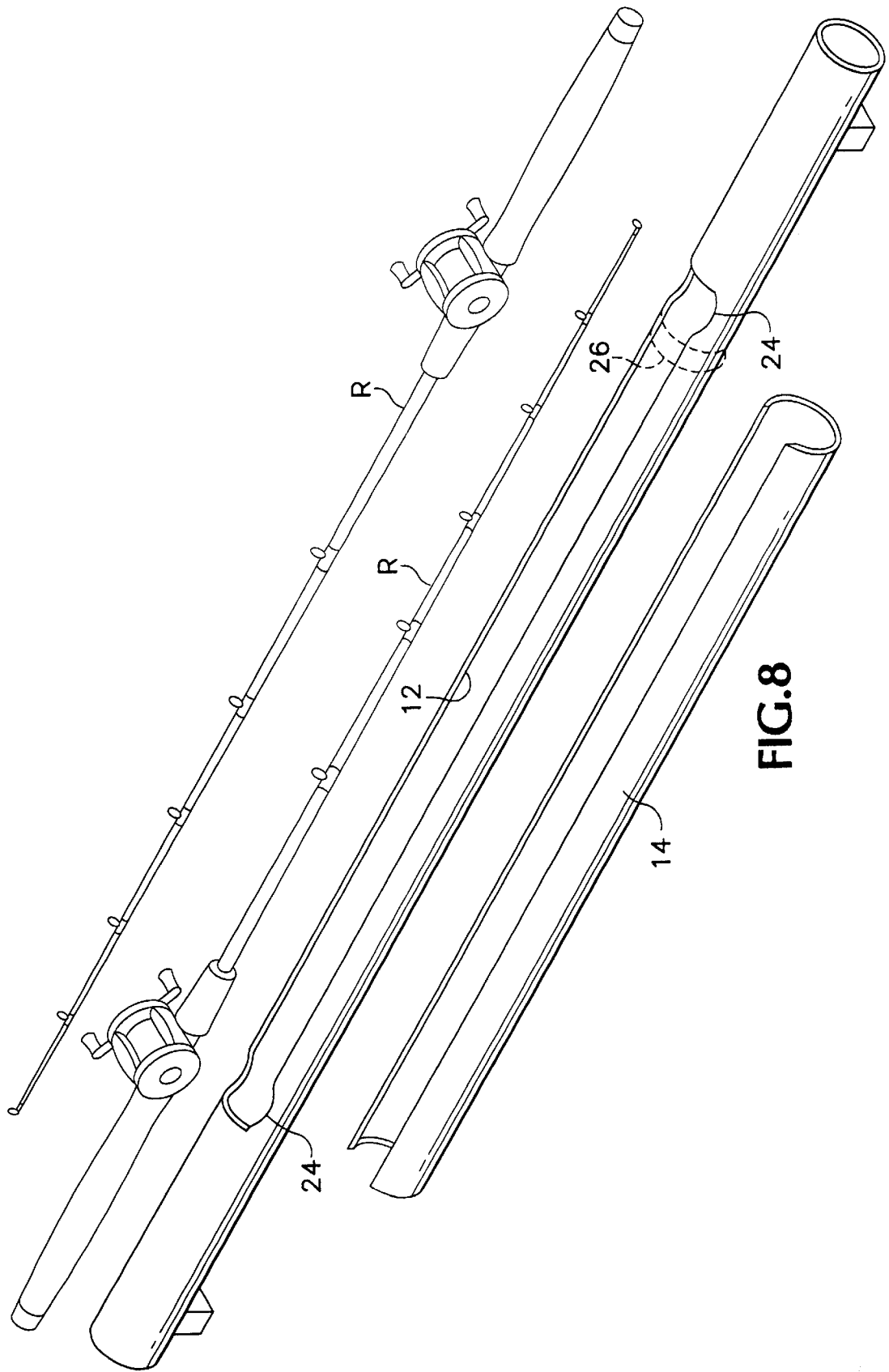
FIG. 8 is a perspective exploded view of a further embodiment of this invention configured to store two fishing rods within a single inner tube, the outer tube being shown detached from the inner tube.

With reference now to the drawings, FIG. 6 most clearly illustrates the individual components of the fishing rod holder of the present invention in a non-assembled, separate condition for simplified viewing. As shown, there is provided a first, inner, hollow tube member 10 having an overall length and diameter selected to house and contain a fishing rod R. The first tube member is also provided with a longitudinally extending, open slot 12 through its upper wall surface with a sufficient length to allow insertion of a fishing rod into the hollow confines of the tube member without undue bending and manipulation of the rod, as can be understood from viewing FIG. 1.

A second outer hollow tube member 14 has an internal diametric bore substantially similar to the external diameter of the first tube member 10 so that the second tube 14 may be installed onto the first, inner tube 10 for axial sliding and rotational movements thereon as seen in viewing FIGS. 1 and 3 of the drawings. The second, outer tube 14 is provided with a longitudinally extending slot 16 through its wall corresponding with the slot 12 through the wall of the first tube member, the slot 16 extending from a point spaced inwardly from one end of the tube longitudinally through the opposite open end of the tube as seen clearly in FIG. 6. Once installed on the first tube member 12, as by sliding thereonto from one of its ends, the outer tube 14 overlies and engages the inner tube member in frictional, sliding and rotational engagement, whereby by manually rotating the outer tube 14 the axial slot 16 may be moved into and out of alignment with corresponding axial slot 12 in the inner tube member 10, as seen in FIGS. 1 and 3.

As shown, the first, inner tube member 10 is provided with mounting base means, illustrated schematically herein as mounting blocks 18, 20 for securing the first tube member in spaced relation to a stationary, supporting surface. In the particular embodiment illustrated, the mounts 18, 20 are secured on the tube member 10 at spaced apart points which are preferably slightly farther apart than is the overall length of the outer tube member 14. In this manner, when the outer tube member 14 is rotated to an open condition in which its axial slot 16 is in alignment with the axial slot 12 on the first tube member 10, the tube member 14 is prevented, by virtue of the abutting contact of the tube against the confining mounts 18, 20, from inadvertent axial sliding movement in either direction, which would undesirably reduce the length of the open slot to the interior of the holder. Conversely, as will be understood in viewing the drawings, when the outer tube 14 is rotated approximately 180° into its tube-closing condition of FIG. 3, the tube member 14 may be slid axially along the inner tube 10, the slot 16 spanning the projecting mounting base 20.

With the foregoing description of the basic structure of the reel-mounting fishing rod holder thus made, it should be clear that, with the rod holder fixedly secured to a stationary structure through the mounting base means 18, 20, the second, outer tube member 14 is positioned and rotated so that the longitudinally extending, open slots 12, 16 are aligned, thus exposing the hollow interior of the first, inner tube member 10 along a substantial portion of its length. A reel-mounting fishing rod is then inserted into the hollow tube 10, tip first, and moved forwardly until the rear, handle end of the fishing rod can be lowered through the slots into the confines of the tube member 10. The fishing rod is then moved rearwardly until the projecting reel assembly comes into abutment with the rear terminal end 12' of the slot 12, as shown in FIG. 3. The outer tube 14 is then rotated approximately 180° to cover and close off the slot 12 and then the tube member 14 is slid axially rearward until its confronting terminal edge 14' comes into abutment with the reel assembly, thus effectively clamping and securing the fishing rod substantially immovably within the confines of the fishing rod holder, with the effectively-clamped fishing reel extending partially outside of the holder.

Interengaging fastening means may be provided for releasably interconnecting the tube members 10, 14 and preventing relative rotation and sliding movement therebetween when the tube members 10, 14 are in their operatively closed condition. One example of such fastening means is illustrated in FIG. 5 of the drawings wherein the tube members 10, 14 are each provided with corresponding bores (not shown) through their walls, said bores coming into alignment with each other when the tube members are oriented in their operative, closed, fishing pole-protecting condition. A cylinder lock member 22 may then be inserted through the aligned bores and operated to prevent withdrawal of the cylinder lock, thereby effectively locking the fishing rod holder positively and securely in its closed condition for security against theft of its contents and inadvertent movement of the second tube member 14 from its operative, closed condition.

As mentioned previously, the mounting base means is illustrated in this embodiment as being configured as a spacer block configured for secure attachment to and mounting on a stationary supporting surface, which may be a building wall, a floor, deck, rooftop rack, inflatable raft frame, or other desired supports. It is to be understood however that the mounting means may also be configured as other type of mounting bracket members that may be configured to attach the fishing rod holder, either permanently or releasably to a desired stationary supporting structure. Additionally, the mounting means may also include corresponding, releasably coupling, interengaging coupling bracket members, already known in the art, arranged for easy engagement or release, whereby the fishing rod holder may be moved as desired from stationary mount to stationary mount and back again as between home, car and boat as discussed earlier.

Another modification that may be made to the fishing rod holder structure described hereinbefore is seen best in FIGS. 6 and 7 of the drawings. In FIG. 6, as with FIGS. 1 and 2, the slot 12 in the first inner tube member 10 terminates with a notched-out portion 24 that is configured to provide a cradle support for a spinning rod reel which, as is known, is a type of reel apparatus that is rather substantial and wide in relation to the fishing pole that it is attached to. FIG. 7 illustrates that, in the case of holders designed specifically for fly fishing rods and reels, the slot 12 may extend much closer to the terminal end of the inner tube 10 and no notch need be provided as may be done for spinning rod reels, because fly casting reels are proportionately much much narrower than spinning reels and more closely approximate the width of a fly casting rod. Similarly, the terminal ends of the tube members may also be configured for engagement with spinning reels, which include a bail member and project from the rod differently than bait casting reels and fly casting reels do.

FIG. 8 shows still another embodiment wherein the elongated slot 12 in the inner tube 10 is provided with reel-receiving notches 24, 24 at both ends, to accommodate the storage of two fishing rods R in the inner tube. The outer tube 14 may extend substantially the full length between the reel-receiving notches, as illustrated, or may be of any shorter length if desired, or alternatively, provided in two separate, shorter-length sections independently slidable and rotatable on the inner tube 10. Indeed, the outer tube may be replaced with a Velcro strip 26 or a cord wrapped about the tube as indicated in broken lines.

From the foregoing it will be apparent to those skilled in the art that various changes other than those already described may be made in the size, shape, type, number and arrangement of parts described hereinbefore. For example, although a single slot opening has been illustrated in the embodiments described, the inner tube 10 and the outer tube 14 may alternatively be provided with a pair of elongated slots extending laterally from opposite sides of the tubes, to accommodate a pair of fishing rods in the one tube. The opposite ends of the inner tube may be closed, if desired, by providing it with sufficient length for manipulation of the fishing rod for storage within the inner tube. These and other changes may be made without departing from the spirit of this invention and the scope of the appended claims.

I claim:

1. A fishing rod storage holder for protectively enclosing and storing a fishing rod when not in use, the fishing rod storage holder comprising:

a) an elongated tube having an overall length sufficient to contain the full length of a fishing rod within its interior, said elongated tube having an axially extending slot configured to receive a fishing rod removably therethrough into and out of the interior of the elongated tube, and b) retainer means on the tube arranged to removably span a portion of the length of the slot for removably securing a fishing rod within the tube.

2. The fishing rod holder of claim 1 including support means on the tube for mounting said tube on a supporting surface.

3. The fishing rod holder of claim 1 including a reel-receiving notch in the tube registering with an end of the slot and configured to seat a reel on a fishing rod contained within the tube.

4. The fishing rod holder of claim 1 including a reel-receiving notch in the opposite ends of the tube each registering with an end of the slot and configured to seat a reel on a fishing rod contained within the tube.

5. The fishing rod holder of claim 1 wherein the tube forms an inner tube and the retainer means comprises an outer tube mounted rotatably on the inner tube and having an axially extending slot arranged for registration with the inner tube slot for removal of a fishing rod from the said inner tube and for rotation about said inner tube for closing the registering portion of the inner tube slot for securing a fishing rod within said inner tube.

6. The fishing rod holder of claim 5 including a reel-receiving notch in the inner tube registering with an end of the slot and configured to seat a reel on a fishing rod contained within the tube.

7. The fishing rod holder of claim 5 including securing means interengaging the inner and outer tubes for securing the outer tube in slot-closing position.

8. A fishing rod holder, comprising:
   a) an elongated inner tube having an axially extending slot configured to receive a fishing rod removably therethrough,
   b) an outer tube mounted rotatably on the inner tube and having an axially extending slot arranged for registration with the inner tube slot for removal of a fishing rod from the said inner tube and for rotation about said inner tube for closing the registering portion of the inner tube slot for securing a fishing rod in said inner tube,
   c) a reel-receiving notch in the inner tube registering with an end of the slot and configured to seat a reel on a fishing rod contained within the tube, and
   d) securing means interengaging the inner and outer tubes for securing the outer tube in slot-closing position.

9. The fishing rod holder of claim 8 including support means on the inner tube for mounting said tube on a supporting surface.

10. The fishing rod holder of claim 8 including a reel-receiving notch in the opposite ends of the inner tube each registering with an end of the slot and configured to seat a reel on a fishing rod contained within the tube.

* * * * *